Jan. 16, 1968   W. C. BELK   3,364,035
CITRUS FRUIT SORTING PROCESS
Filed May 22, 1967   4 Sheets—Sheet 1
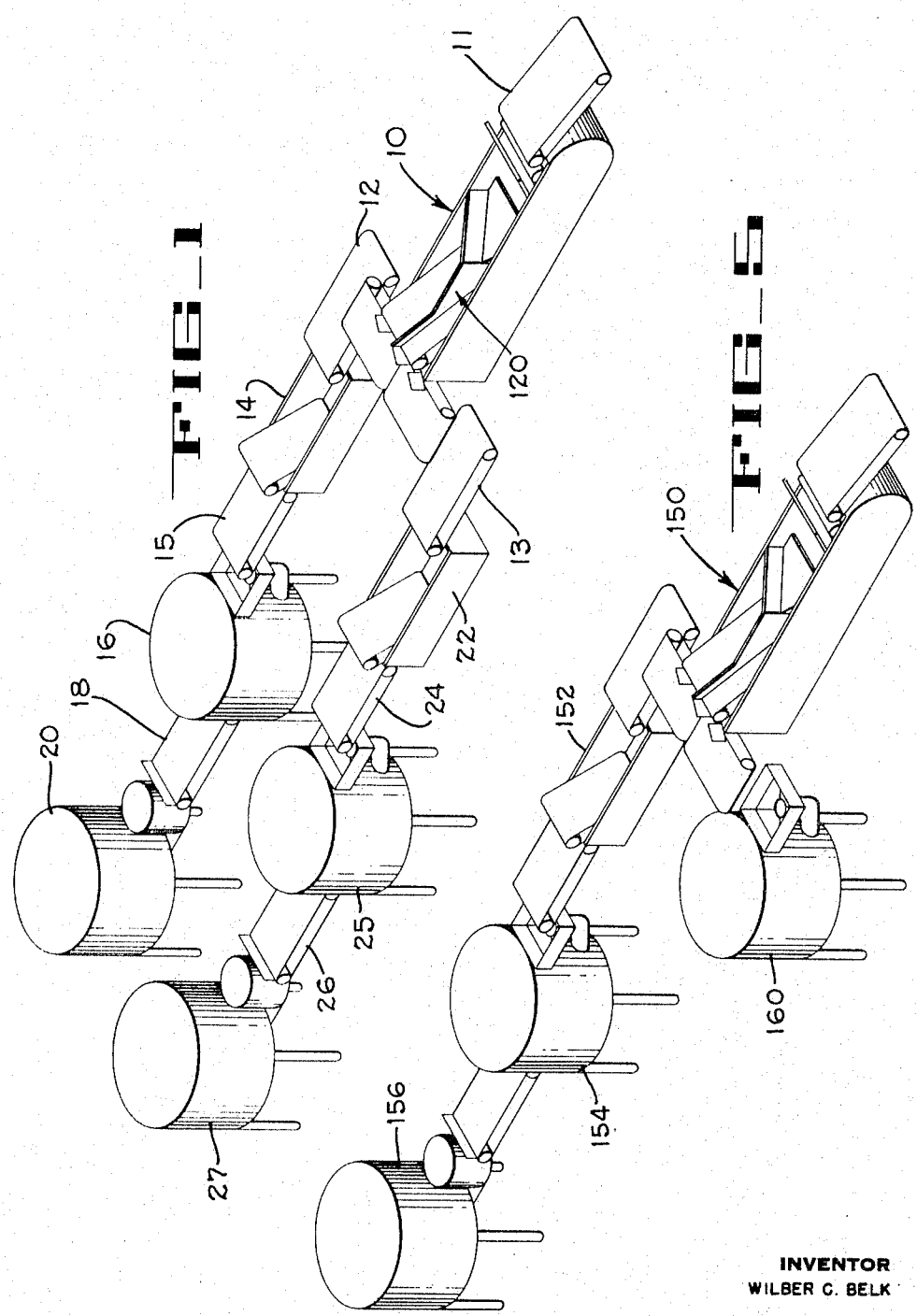
INVENTOR
WILBER C. BELK
BY Francis W. Anderson
ATTORNEY Jan. 16, 1968  W. C. BELK  3,364,035
CITRUS FRUIT SORTING PROCESS
Filed May 22, 1967  4 Sheets-Sheet 2
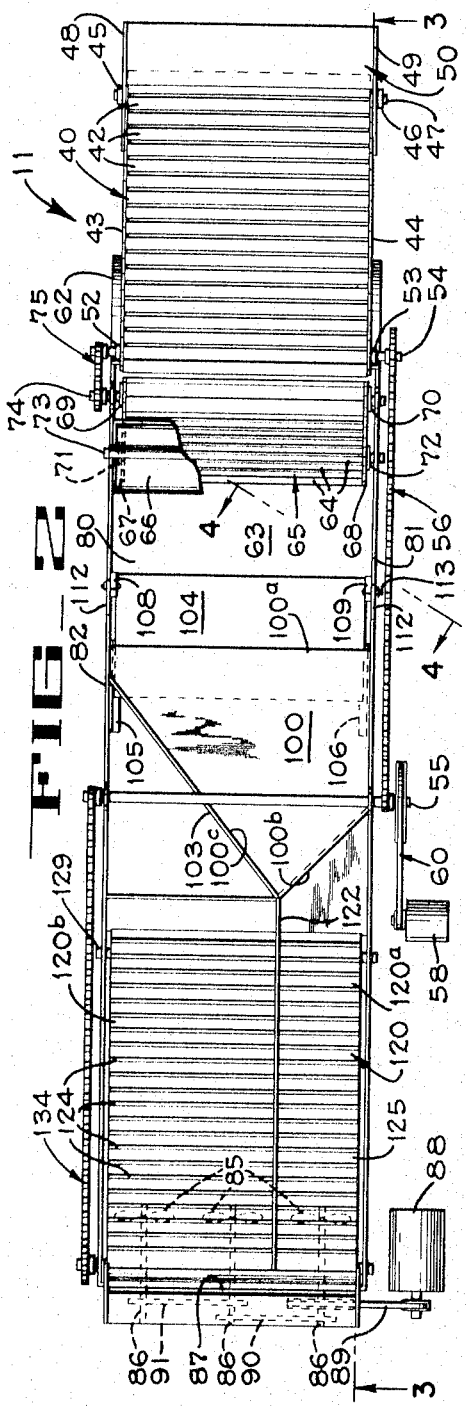
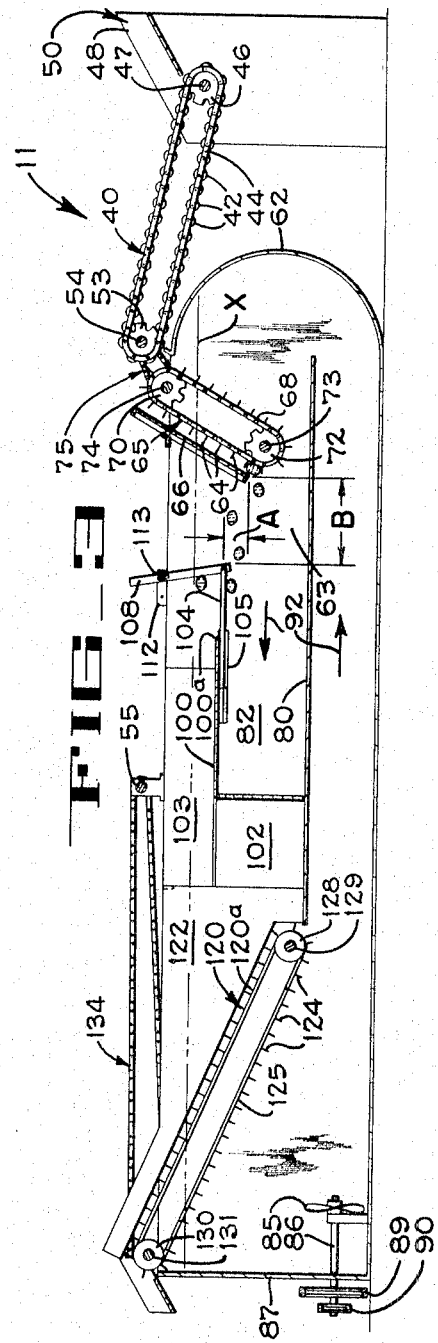
INVENTOR
WILBER C. BELK
BY *Francis W. Anderson*
ATTORNEY

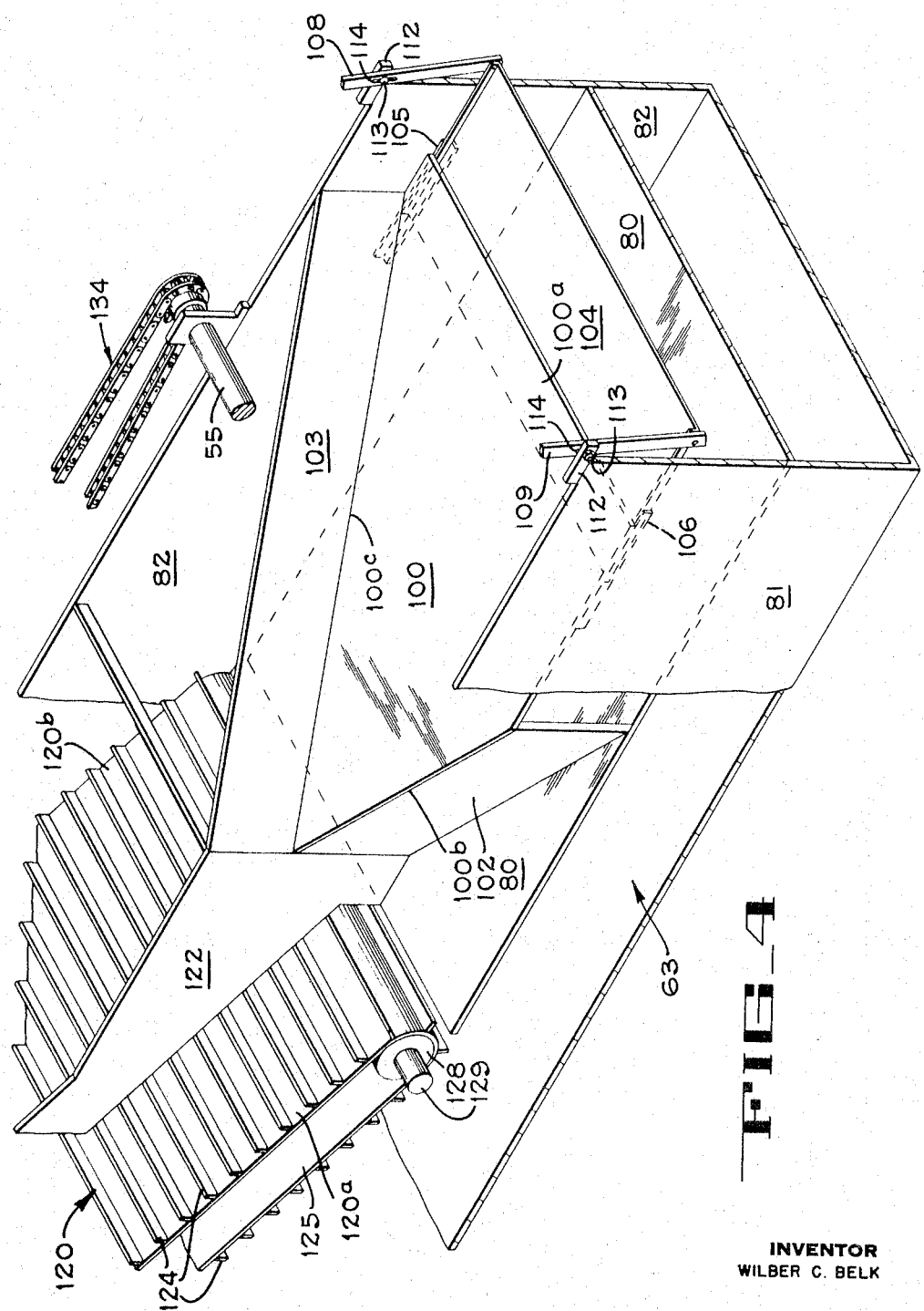
FIG_4

Jan. 16, 1968 W. C. BELK 3,364,035
CITRUS FRUIT SORTING PROCESS
Filed May 22, 1967 4 Sheets-Sheet 4
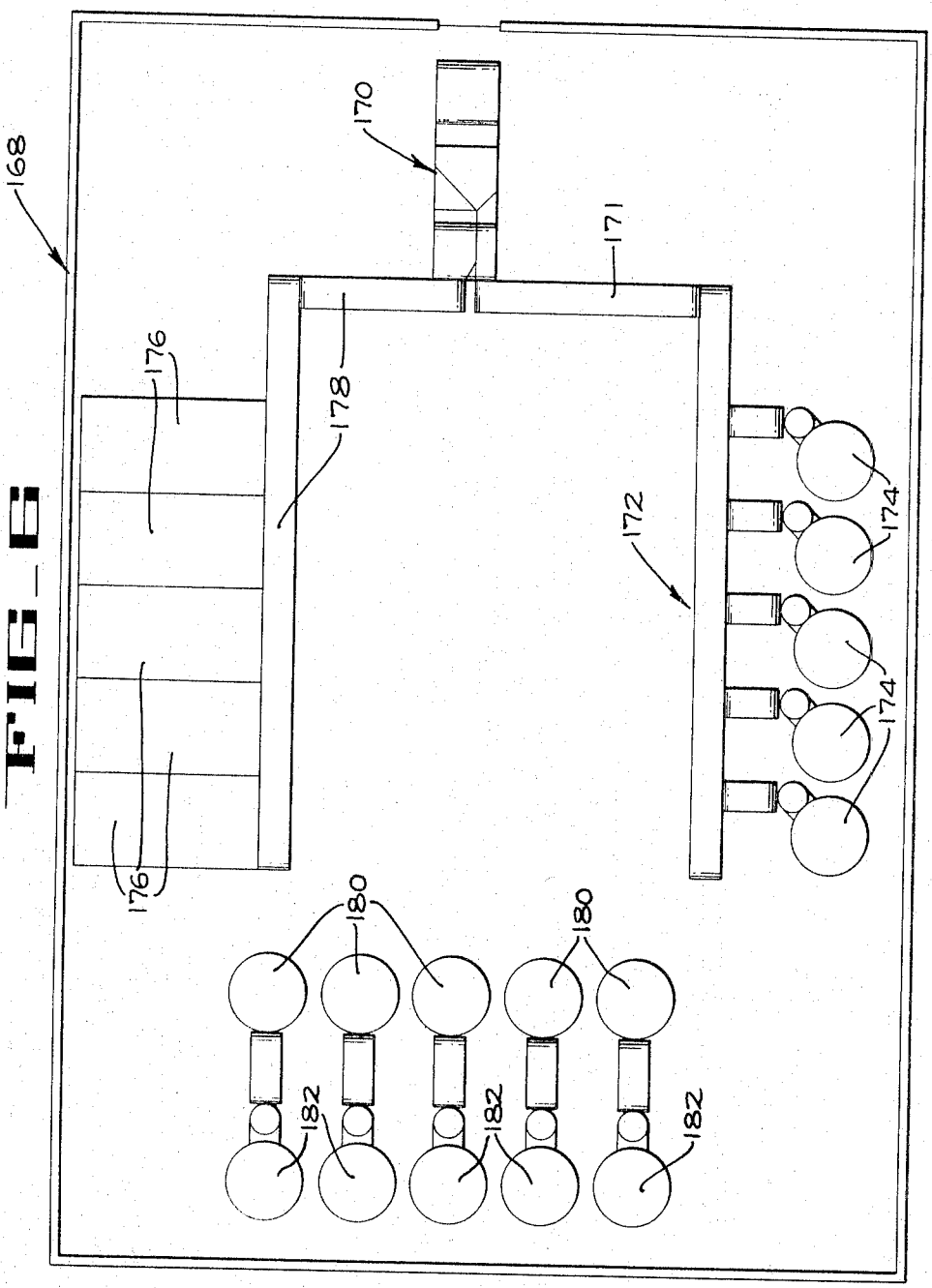
INVENTOR
WILBER C. BELK
BY *Francis W. Anderson*
ATTORNEY United States Patent Office
3,364,035
Patented Jan. 16, 1968

3,364,035
CITRUS FRUIT SORTING PROCESS
Wilber C. Belk, Lakeland, Fla., assignor to FMC Corporation, San Jose, Calif., a corporation of Delaware
Continuation-in-part of application Ser. No. 563,657, July 8, 1966. This application May 22, 1967, Ser. No. 640,288
9 Claims. (Cl. 99—100)

ABSTRACT OF THE DISCLOSURE

A process for sorting thick-skinned citrus fruit from thin-skinned citrus fruit by releasing the fruit into and below the surface of a liquid that is moving along a path and having a specific gravity of from .90 to .92 so that the fruit will rise and simultaneously move downstream in the path, and obstructing the upward movement of the thinnest-skinned fruit by positioning a horizontal barrier in the fluid sufficiently downstream from the point where the fruit are released to allow the thickest-skinned fruit to rise above the barrier prior to passing the upstream edge thereof.

CROSS REFERENCE TO RELATED APPLICATIONS

The present application is a continuation-in-part of my copending application, Ser. No. 563,657, filed July 8, 1966, now abandoned which is a continuation of Ser. No. 123,536, filed July 12, 1961. The latter application, now abandoned, is a division of Patent No. 3,031,081.

BACKGROUND OF THE INVENTION

Field of the invention

The invention relates to article sorting processes and, more particularly, to processes for sorting citrus fruit on the basis of specific gravity.

Description of the prior art

Prior art sorting processes were directed to sorting frost-bitten fruit from good fruit. Such fruits have a relatively large difference in their specific gravities and, consequently, a liquid having a high specific gravity, such as water, was used. This caused the fruit to rise very quickly in the liquid, however, because of the large difference in the specific gravities of the fruit, the frost-bitten fruit would rise far more rapidly than good fruit and separation could occur prior to passing down stream of a horizontal barrier.

SUMMARY OF THE INVENTION

Grapefruit and other citrus fruit are prepared for commercial canning by subjecting the fruit to a blanching operation, peeling the blanched fruit, and then separating the fruit into sections. One important function of the blanching operation is the preparation of the skin so that it can be peeled most efficiently. It has been found that the skin of grapefruit blooming in the later part of a growing season may be twice as thick as the skin of early-blooming grapefruit. All the grapefruit is picked at the same time and forwarded to the processing plant as a lot. If the entire lot is subjected to a blanching operation adapted for fruit having thick skins, the fruit having thin skins is overcooked and it becomes impossible to efficiently peel and sectionize such fruit. On the other hand, if the blanching operation is suitable for the blanching of fruit having thin skins, the fruit having thick skins are not adequately prepared for the peeling and sectionizing operations.

It is thus necessary to sort the fruit on the basis of skin thickness prior to blanching. It was discovered that a sorting process using a moving liquid could be utilized if the specific gravity of the liquid was close to the specific gravities of the fruit and thus permit a slower rise than if water were used. For example, a liquid having a specific gravity of 0.85 was found to be ideal. A liquid having a specific gravity in the range of 0.90–0.92 was found satisfactory if the fruit was discharged well below the surface of the liquid prior to being released.

BRIEF DESCRIPTION OF THE DRAWINGS

FIGURE 1 is a diagrammatic perspective of a fruit processing system adapted to carry out the process of the present invention.

FIGURE 2 is an enlarged diagrammatic plan of the portion of the apparatus of FIG. 1 that is particularly adapted for separating citrus fruit according to skin thickness.

FIGURE 3 is a diagrammatic vertical section taken along line 3—3 of FIG. 2.

FIGURE 4 is an enlarged perspective of a portion of the fruit separating apparatus of FIG. 2, the view being taken in the direction of arrows 4—4 of FIG. 2.

FIGURE 5 is a diagrammatic perspective showing an arrangement for carrying out a second embodiment of the process of the present invention.

FIGURE 6 is a diagrammatic plan showing an arrangement for carrying out a third embodiment of the process of the present invention.

DESCRIPTION OF THE PREFERRED EMBODIMENTS

The fruit processing apparatus of the present invention comprises a fruit separating unit 10 (FIG. 1) arranged to receive a quantity of grapefruit, or other citrus fruit from a feed conveyor 11. The unit separates the fruit according to skin thickness and delivers grapefruit having a first range of skin thickness to a conveyor 12 and grapefruit having a second range of skin thicknesses to another conveyor 13. The conveyor 12 delivers the grapefruit into a blanching unit 14 where the fruit is subjected to a blanching treatment. During this treatment the grapefruit is subjected to a blanching medium, such as steam or hot water at a predetermined temperature. The duration of the treatment and the temperature of the blanching medium is such that grapefruit having skin thicknesses in said first range of thicknesses, will be given a predetermined optimum blanching without overcooking of the fruit. Accordingly, the skin of the fruit is in condition for most effective peeling when it leaves the blanching unit 14, and the flesh of the grapefruit is in the firm condition which makes efficient sectionizing possible. Upon being discharged from the blanching unit 14, the grapefruit is carried by a conveyor 15 to a feed station of a peeling machine 16, the mechanisms of which have been particularly adjusted to handle fruit having skin thicknesses in said first range of thicknesses. After being peeled, the fruit is carried by conveyor 18 to a sectionizing machine 20 which divides the firm fruit into a plurality of sections suitable for canning.

In a similar manner, the conveyor 13 delivers the fruit having skin thicknesses in said second range to a blanching unit 22 in which the fruit is subjected to a blanching treatment particularly designed for fruit having such skin thicknesses. Upon being discharged from unit 22, the fruit is carried by conveyor 24 to the feed station of a peeling unit 25 and, after being peeled, the fruit is carried by a conveyor 26 to a sectionizing machine 27.

The sectionizing machines 20 and 27 may be of the type disclosed in the U.S. Patent No. 3,072,160. The peeling machines 16 and 25 are preferably of the type disclosed in the U.S. Patent No. 2,958,356. The blanching units 14 and 22 may be of any commercial type.

The feed conveyor 11 (FIGS. 2 and 3) comprises an endless belt 40 made up of a plurality of transverse rods 42 secured at their opposite ends to two chains 43 and 44. Idler sprockets 45 and 46 are journalled on a shaft 47 which extends between side walls 48 and 49 of a feed chute or hopper 50. Drive sprockets 52 and 53 are keyed to a shaft 54 that is driven by a shaft 55 through a sprocket and chain drive arrangement 56. The shaft 55 is in turn driven by a motor 58 through a belt and pulley drive 60.

The feed conveyor 11, which receives the fruits after they have been graded as to size (the size grading is due solely to the limitations of the subsequent sectionizing operation) is arranged to discharge the fruit over the forward wall 62 of a tank 63 of the fruit separator 10. The fruits are deposited on flat flights 64 a conveyor 65 which is arranged to confine the fruit between adjacent flights 64 and positively carry the fruit down into the liquid in the tank. The fruits are retained in the flights by a cover plate 66 fastened between the side walls 81 and 82 of the tank. The fruit lowering conveyor 65, which will be called a lowerator, comprises a pair of spaced endless chains 67 and 68 between which the flights 64 are secured in such a manner that the flights are rigidly held in a position projecting outwardly from the descending run of the lowerator. The chains 67 and 68 are trained around drive sprockets 69 and 70, respectively and around idler sprockets 71 and 72 respectively. The idler sprockets are journalled on a shaft 73 and the drive sprockets are keyed to a shaft 74 that is driven by shaft 54 through a chain and sprocket drive 75. When the flights of the lowerator move around the lower idler shaft 73 and away from the cover plate the confined fruits are discharged into circulating liquid in the tank.

The liquid in the tank, which is maintained at a level indicated by phantom line X, is an emulsion formed of water and mineral spirits and has a specific gravity in the range between .90 and .92. A horizontal partition 80 (FIG. 3) extends across the tank from one side wall 81 to the other side wall 82. Three impellers 85 (FIG. 2) are mounted in the tank on shaft 86, that project through a rear wall 87 of the tank and are driven by a variable speed motor 88 through belt and pulley drives 89, 90 and 91. When the impellers 85 are operating, the liquid is circulated in a counterclockwise direction, indicated by arrows 92, around the horizontal partition 80.

When each fruit is released from the lower end of the lowerator 65, it will rise in the liquid at a rate dictated by its specific gravity. Then, as the fruit is carried along by the moving liquid, it will pass above or below a horizontal partition or dividing plate 100 depending upon the level at which it is floating at that time. As seen in FIGS. 2 and 4, the partition 100 is generally triangular in configuration, having a forward portion 100a secured to the side walls 81 and 82 of the tank, a rear slanted edge portion 100b secured to a vertical partition 102 extending upwardly from the tank partition 80, and a slated edge portion 100c on which is supported a second slanted vertical portition 103. An extension of the forward portion 100a is provided by a plate 104 that is slidably disposed between the undersurface of partition 100 and inwardly projecting horizontal legs of angle bars 105 and 106 that are secured to the inner surface of side walls 81 and 82 respectively. The extension 104 may be adjusted relative to the partition 100, to change the position of the leading edge of the partition, by means of two levers 108 and 109 that are pivotally connected at their lower ends to the extension 104 and are pivoted intermediate their ends on mounting bars 112 secured to the tank walls 81 and 82. Thus an adjustment can be easily made to compensate for different liquid velocities and to vary the number of fruits of a particular range of skin thicknesses rising above the partition. In order to get the fruit of desired skin thicknesses above the partition, when using a desired liquid velocity, it is only necessary to make a trial test by running a few fruits through the tank and then cutting them open to examine the thicknesses of their skins. It should be noted that the skins contain an outer layer, called the flavedo and an inner spongy layer called the albedo. Of the two layers it is the latter that contributes most to the specific gravity of the fruit and it is this layer that varies most in thickness during a growing season. After determining the results of this test, which is easily within the skill of the art, the extension is adjusted to obtain the desired separation. By way of example, one satisfactory arrangement is a vertical distance of 4 inches, indicated in the drawing by the letter A, and a horizontal distance of 18¾ inches, indicated in drawing by the letter B. A belt 113 extends through each mounting bar and through a slot 114 in each lever, and each belt is fitted with a suitable nut and lock washers to hold the extension in selected, adjusted position.

The fruit that passes above the partition 100, is diverted laterally by the vertical partition 103 and is guided to a portion 120a of an elevator 120 which has a portion 120b on the other side of a vertical partition 122. The elevator 120, which raises the fruit out of the tank, comprises a plurality of slats or flat bars 124 secured to an endless belt 125 (FIG. 4). The belt 125 is trained around an idler roller 128 journalled on a shaft 129 and around a drive roller 130 keyed to a shaft 131 that is driven by shaft 55 by means of a chain and sprocket drive 134.

The fruit that is carried under the partition 100 (FIG. 4) is diverted laterally by the vertical partition 102 and is directed onto portion 120b of the elevator 120 to be lifted out of the tank. It will be seen that the separating unit 10 will separate fruit into two groups which are determined by the level at which the fruit floats in the liquid at the time they pass the upstream edge of the extension.

It should be noted that the sorting operation is intended to primarily segregate those fruits having the thickest skins from those fruits having thinnest. Any fruits which are of marginal skin thickness, that is, have skin thickness which are close to the mid-range of skin thickness, may stay below or rise above the partition depending upon whether or not they rise along a completely unobstructed path. These fruits, however, do not present problems during the subsequent blanching operation because the thickness of their skins will be close enough to the other fruit in that particular group so that the blanching will be adequate to effectively prepare these fruits for peeling without damaging the meat of the fruit. In other words, it is only the fruit having skin thickness which approach the outer limits of thickness and thinness which must be segregated into separate groups prior to the blanching operation.

It has been found that a liquid having a specific gravity in the range of from .90 to .92 is effective, when used in connection with the present machine to separate grapefruit into two groups, one of which consists of grapefruit having a skin thickness in a first range, called a normal thickness range, and the other of which consists of grapefruit having a skin thickness in a second range that is thicker than the normal range.

If the specific gravity of the liquid is relatively high, as for example .90, grapefruit that is dropped directly into the liquid without using a lowerator, as 65, will tend to remain at an upper level and will not have a chance to first sink downwardly and then rise to a proper level before it reaches the partition 100. Accordingly, if the fruit is dropped directly into the tank, the liquid should have a specific gravity of approximately .85. Such a liquid will permit the fruit to sink initially to a level at which it can begin its rise to a height dictated by its skin thickness before the partition 100 is reached. As previously mentioned, when the lowerator 65 of the present invention is used, the fruit is positively carried downwardly under the surface of the liquid and is released at an advantageous point where it can immediately begin its rise. Accordingly, when the fruit is introduced into the tank by the lowerator, a liquid having a specific gravity in the range of .90 to .92 may be used. Since a solution, such as mineral spirits must be added to water to lower the specific gravity of the water, it is obviously less expensive to obtain a tank of liquid having a .92 specific gravity than a tank of liquid having .85 specific gravity. Accordingly, the lowerator makes possible a particularly economical installation.

Referring to FIG. 1, it will be seen that, after being separated according to skin thickness in the separator 10, each group of grapefruit is directed to a blanching unit 14 or 22 wherein it is subjected to a blanching treatment that is particularly suitable, in the matter of the temperature and the duration of the treatment, for grapefruit having the range of skin thicknesses characteristic of that group. After being subjected to this advantageous blanching treatment, the skin of the grapefruit is in a desirable condition for peeling in the peeling unit 16 or 25 and the flesh of the grapefruit is firm and suitable for a sectionizing operation.

In FIG. 5 an arrangement is shown that is adapted to carry out another embodiment of the processing method of the present invention. In this arrangement, grapefruit is separated into two groups in a separator unit 150, which is identical to unit 10. The first group will have fruit with a thickness greater than normal and this group is directed to a blancher 152, then to a peeling unit 154, and finally to a sectionizer 156. The thick-skinned fruits of the second group are directed to a juice extracting machine 160 which may be of any commercial form. Thus, this second process consists of separating grapefruit into two groups according to skin thickness and directing the fruit having normal skin thickness through suitable blanching, peeling, and sectionizing machines and directing the thick-skinned grapefruit to a juicer.

In FIG. 6 a system for processing grapefruit using the fruit-separating apparatus of the present invention, is illustrated. When the grapefruits are brought from the field to a cannery 168, in trucks or the like, they are immediately directed into a separator 170 where the fruits are separated according to skin thickness. The thick-skinned fruits are directed by a conveyor 171 to a juicer station 172 where a plurality of juice-extracting machines 174 process the fruit. The fruits having normal skin thickness are directed to storage bins 176, either by a conveyor 178 or any other suitable transporting means. The fruits are held in the storage bins for aging for a period of from two to four days and are then processed in peeling and sectionizing machines 180 and 182, respectively.

It will be apparent that, since all fruit to be sectionized and canned must be held in bins for from two to four days, the provision of bin space in a cannery becomes a problem at the time the fruit is harvested. In accordance with the present invention, thick-skinned fruit, that is undesirable for canning, immediately separated out and subjected to a juicing operation for which no aging of the fruit is required. Thus, the amount of fruit to be stored in bins is greatly reduced and much less storage space is required. This entire method of processing citrus fruit is made possible by the separator of the present invention which is effective to separate the fruit according to skin thickness.

From the foregoing description it will be apparent that the present invention provides a novel, efficient method of processing grapefruit, said method being dependent upon the new concept of separating citrus fruit according to skin thickness. The use of the lowerator makes possible an efficient separation of the grapefruit in a relatively economical liquid. The adjustable extension on the main fruit separating partition provides means for coordinating the permissible distance a grapefruit may travel with the rate of flow of the liquid and the lifting power of the liquid.

It will be understood that modification and variations may be effected without departing from the scope of the present invention. Accordingly, it will be understood that the invention is limited only by the scope and proper interpretation of the annexed claims.

Having completed a detailed description of the invention so that those skilled in the art could practice the same, I claim:

1. A method of processing citrus fruit comprising the steps of sorting the fruit on the basis of skin thickness by introducing a plurality of citrus fruits in a liquid moving along a predetermined path and having a specific gravity in the range of 0.85 to 0.92 and adapted to place the citrus fruit of different skin thicknesses at different levels at a predetermined point along said path, and separating said citrus fruit into groups by segregating groups floating at different levels at said predetermined point in said liquid.

2. A method of processing citrus fruit having skins of different thickness comprising the steps of sorting the fruit on the basis of skin thickness by introducing a plurality of the citrus fruits into a liquid having a specific gravity less than 1, moving the liquid at a predetermined speed and in a predetermined path, obstructing the upward free floating passage of certain of the fruit at a point along said path to direct the fruit into upper and lower levels of the liquid whereby the fruit having the thickest skins will be collected in the upper level and fruit having the thinnest skins will be collected in the lower level.

3. The method defined by claim 2 wherein the fruit is released in the liquid substantially below the top surface thereof and wherein the specific gravity of the liquid is between 0.90–0.92.

4. The method defined by claim 2 further including the steps of separately blanching the groups of citrus fruit collected at each level so that the entire peels of the fruit may be removed without heat damaging the remainder of the fruit.

5. The method defined by claim 4 further including the steps of peeling and sectionizing the blanched fruit.

6. The method defined by claim 3 wherein said liquid has a specific gravity in the range of 0.85 to 0.92.

7. The method defined by claim 2 wherein the fruit is released in the liquid near the bottom thereof.

8. The method defined by claim 1 further including the step of blanching the fruit of each group.

9. The method defined by claim 6 further including the steps of blanching the fruit of each group.

No references cited.

HYMAN LORD, *Primary Examiner.*

M. VOET, *Assistant Examiner.*